United States Patent [19]

Leland

[11] 4,448,918

[45] May 15, 1984

[54] POLY(ARYLENE SULFIDE) COMPOSITION CONTAINING TITANIUM DIOXIDE AND 3-MERCAPTOPROPYLTRIMETHOXYSILANE

[75] Inventor: John E. Leland, Bartlesville, Okla.

[73] Assignee: Phillips Petroleum Company, Bartlesville, Okla.

[21] Appl. No.: 434,662

[22] Filed: Oct. 15, 1982

[51] Int. Cl.$^3$ ............................ C08K 5/54; C08K 3/22
[52] U.S. Cl. ..................................... 524/262; 524/413; 524/451; 524/609
[58] Field of Search ........................ 524/413, 262, 451

[56] References Cited

U.S. PATENT DOCUMENTS

| | | | |
|---|---|---|---|
| 3,157,614 | 11/1964 | Fischer | 524/451 |
| 3,622,376 | 11/1971 | Tieszen et al. | 428/419 |
| 3,622,537 | 11/1971 | Needham et al. | 524/305 |
| 3,894,983 | 7/1975 | Higbee | 524/451 |
| 3,929,708 | 12/1975 | Brady et al. | 524/267 |
| 4,134,874 | 1/1979 | Needham | 524/431 |
| 4,176,098 | 11/1979 | Needham | 524/174 |
| 4,247,598 | 1/1981 | Blackwell | 524/451 |
| 4,284,549 | 8/1981 | Salee | 524/262 |

FOREIGN PATENT DOCUMENTS 52-52958  4/1977  Japan .................................. 524/262

Primary Examiner—Lewis T. Jacobs

[57] ABSTRACT

An electrical insulation composition containing poly(arylene sulfide), titanium dioxide and 3-mercaptopropyltrimethoxysilane.

19 Claims, No Drawings

POLY(ARYLENE SULFIDE) COMPOSITION CONTAINING TITANIUM DIOXIDE AND 3-MERCAPTOPROPYLTRIMETHOXYSILANE

This invention relates to poly(arylene sulfide) compositions.

In one aspect this invention relates to electrical insulation materials and poly(arylene sulfide) compositions useful as such materials.

BACKGROUND

Carbonization of poly(arylene sulfide) electrical insulation materials can occur under the influence of high electrical potential drops. In application the surface of an insulator typically accumulates dust, moisture, oils and so on. This accumulation of contaminants can create a conductive layer on the outer surface of the insulation material which, under the influence of sufficient potential drop, will "breakdown electrically" thus allowing the passage of current through the conductive layer and along the insulation surface. Heat, generated by the resistive dissipation of electrical energy as current passes through the conductive layer, causes decomposition or evaporation of the conductive medium. The passage of current, which may last for only a very short period of time, often exists in the form of an electrical arc across the surface of the insulator. The resultant high temperature along the current path promotes carbonization of carbonizable insulation material. This carbonization produces a carbon path which, if allowed to develop under the influence of successive surface tracking breakdown cycles, will ultimately produce a continuously conductive path which in turn will allow the continuous passage or leakage of current along the surface of the poly(arylene sulfide) insulation material.

The resistance of an electrical insulation material to carbonization and the formation of conductive tracks can be measured by, for example, a Comparative Tracking Index test. The ASTM Test Method designated D 3638-77 and entitled "Comparative Tracking Index of Electrical Insulating Materials" describes the test in detail and is incorporated by reference herein. A description of the test can be found in the 1982 Annual Book of ASTM Standards, Part 39. The test is summarized therein as follows:

The surface of a specimen of electrical insulating material is subjected to a low-voltage alternating stress combined with a low current which results from an aqueous contaminant (electrolyte) which is dropped between two opposing electrodes every 30 s. The voltage applied across these electrodes is maintained until the current flow between them exceeds a predetermined value which constitutes failure. Additional specimens are tested at other voltages so that a relationship between applied voltage and number of drops to failure can be established through graphical means. The numerical value of the voltage which causes failure with the application of 50 drops of the electrolyte is arbitrarily called the comparative tracking index. This value provides an indication of the relative track resistance of the material.

The significance of the ASTM test is described, in part, as follows:

Electrical equipment may fail as a result of electrical tracking of insulating material that is exposed to various contaminating environments and surface conditions . . . . This method is an accelerated test which at relatively low test voltages, provides a comparison of the performance of insulating materials under wet and contaminated conditions . . . .

When organic electrical insulating materials are subjected to conduction currents between electrodes on their surfaces, many minute tree-like carbonaceous paths or tracks are developed near the electrodes. These tracks are oriented randomly, but generally propagate between the electrodes under the influence of the applied potential difference. Eventually a series of tracks spans the electrode gap, and failure occurs by shorting of the electrodes.

OBJECTS

It is an object of this invention to provide poly(arylene sulfide) compositions.

It is another object of this invention to provide electrical insulation compositions.

It is another object of this invention to improve the resistance of poly(arylene sulfide) compositions to carbonization and track formation.

These objects and other objects and advantages will become apparent from a study of this disclosure and the appended claims.

BRIEF SUMMARY OF THE INVENTION

In accordance with this invention the resistance of a poly(arylene sulfide) composition to carbonization and track formation can be increased by combining poly(arylene sulfide), titanium dioxide and 3-mercaptopropyltrimethoxysilane. This invention, in its broad concept, is a composition including at least poly(arylene sulfide), titanium dioxide and 3-mercaptopropyltrimethoxysilane.

This invention is further defined by, and other aspects of this invention are identified in, the disclosure which follows.

DETAILED DESCRIPTION OF THE INVENTION

This invention relates to poly(arylene sulfide) compositions. The term poly(arylene sulfide) is intended to designate arylene sulfide polymers. The scope of this invention broadly encompasses all such polymers.

Without being limited thereto, uncured or partially cured poly(arylene sulfide) whether homopolymer, copolymer, terpolymer, and the like, or a blend of such polymers, can be used in the practice of this invention. The uncured or partially cured polymer is a polymer the molecular weight of which can be increased by either lengthening of a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein. Examples of poly(arylene sulfide) polymers suitable for purposes of this invention include poly(2,4-tolylene sulfide), poly(4,4'-biphenylene sulfide) and poly(p-phenylene sulfide). Because of its availability and desirable properties (such as high chemical resistance, nonflammability, and high strength and hardness) poly(p-phenylene sulfide) is the presently preferred poly(arylene sulfide).

In accordance with this invention poly(arylene sulfide) is combined with titanium dioxide ($TiO_2$) and 3-mercaptopropyltrimethoxysilane ($HS(CH_2)_3Si(OCH_3)_3$) to produce a composition. Both titanium dioxide and 3-mercaptopropyltrimethoxysilane are commercially available. The broad concept of this invention is not limited to any specific minimum or maximum amount of any of these three components. It is desirable, of course, that the titanium dioxide and the silane be present in an amount sufficient to increase the poly(arylene sulfide)'s resistance to carbonization and track formation. It is contemplated that the amount of titanium dioxide employed will generally be about 5 to about 100 parts by weight per 100 parts by weight of poly(arylene sulfide). It is similarly contemplated that the amount of 3-mercaptopropyltrimethoxysilane employed will generally be about 0.1 to about 20 parts by weight per 100 parts by weight of poly(arylene sulfide).

In one embodiment of this invention the above-described composition additionally includes talc. The mineral talc is a natural hydrous magnesium silicate designated by the formula $Mg_3Si_4O_{10}(OH)_2$. It has a theoretical composition of about 31.7% MgO, 63.5% $SiO_2$ and 4.8% $H_2O$. A large number of mineral mixtures are sold as "talc". The term talc for the purposes of this disclosure and the appended claims is intended to be broadly construed. A detailed description of talc can be found in the Kirk-Othmer Encyclopedia of Chemical Technology, 2nd Edition, Volume 19, pages 608–612.

The preferred talc is California talc characterized by a platy shape, and a median particle size of less than about 4 microns. Talc satisfying the above criteria can be used to give poly(arylene sulfide) composition increased resistance to carbonization and track formation as measured in accordance with the Comparative Tracking Index (CTI) test previously described. The term particle size is intended to mean the equivalent spherical diameter of the particle. It should also be noted that a typical talc can have a wide particle size distribution associated with it. It is the median particle size (not the average particle size) that is used to define the preferred talc. The median particle size is that size below which the sizes of half of the talc particles fall. The other half of the particles have sizes greater than the median particle size.

An example of a preferred talc is the talc designated CP10-40 sold by the Minerals, Pigments and Metals Division of Pfizer of New York, N.Y. This talc is a California talc characterized by a platy shape and a median particle size of about 1.9 microns. A typical composition (calculated as the oxides) is as follows:

|  |  | weight percent |
|---|---|---|
| silicon dioxide | ($SiO_2$) | 52.4% |
| magnesium oxide | (MgO) | 27.6% |
| calcium oxide | (CaO) | 6.2% |
| aluminum oxide | ($Al_2O_3$) | 1.4% |
| ferric oxide | ($Fe_2O_3$) | 0.3% |
| acid solubles as CaO—max |  | 9.0% |
| loss on ignition |  | 10.3% |

The composition given above is as provided by Pfizer.

In another embodiment of this invention the composition, in addition to poly(arylene sulfide), titanium dioxide and 3-mercaptopropyltrimethoxysilane, includes glass. The glass can be in any shape or form but glass fibers are preferred because they impart good mechanical strength to the composition.

In addition to talc and/or glass the composition can further include, if desired, fillers, reinforcements, processing aids, pigments, etc. Examples of fillers can be found in the Encyclopedia of Polymer Science and Technology, Volume 6, pages 740–762 and in the Kirk-Othmer Encyclopedia of Chemical Technology, 3rd Edition, Volume 10, pages 198–214. Examples of reinforcements can be found in the Encyclopedia of Polymer Science and Technology, Volume 12, pages 1–57. Processing aids (such as, for example, zinc stearate, $Li_2CO_3$, etc.), pigments and other additives are also well known in the art.

The poly(arylene sulfide), titanium oxide, 3-mercaptopropyltrimethoxysilane and other components (e.g. talc, glass, fillers, reinforcements, processing aids, pigments, etc.) if desired, can be combined together in any manner capable of producing a good mix. Persons of skill in the art are familiar with conventional blending or mixing methods and apparatus suitable to make the compositions of this invention. The reader is referred to the Kirk-Othmer Encyclopedia of Chemical Technology, 3rd Edition, Volume 15, pages 604 to 637 and the Encyclopedia of Polymer Science and Technology, Volume 4, pages 118 to 128 for more detailed information concerning mixing, blending and compounding.

The following recommended ranges are presented to provide some guidance and to illustrate some of the compositions within the scope of this invention. The numbers given below represent the parts by weight of the corresponding component per 100 parts by weight of poly(arylene sulfide).

|  | Broad Range | Intermediate Range | Narrow Range |
|---|---|---|---|
| Poly(arylene sulfide) | 100 | 100 | 100 |
| Titanium dioxide | 5–100 | 20–50 | 31–41 |
| 3-mercaptopropyl-trimethoxysilane | 0.1–20 | 1–5 | 2–3 |
| Talc | 0–140 | 50–115 | 62–72 |
| Glass fibers | 0–140 | 50–100 | 66–76 |

The poly(arylene sulfide) compositions of this invention are useful as electrical insulation materials. An embodiment of this invention is an electrical apparatus employing a poly(arylene sulfide) composition of this invention as an electrical insulation material. It is intended that the term electrical apparatus be interpreted very broadly.

The compositions of this invention are useful for purposes and applications other than electrical insulation. A wide variety of applications for poly(arylene sulfide) compositions in general is well known and the compositions of this invention can be employed in many of those applications.

The following examples were selected for presentation in this disclosure because of the good results obtained and because they provide a good illustration of certain embodiments of this invention.

EXAMPLES

The various compositions described in the examples were produced in batches ranging in weight from 10 to 25 lbs. Each composition was prepared by blending its components, except for glass, for about 3 minutes in a Henschel mixer at room temperature operating at about 1800 RPM. After this mixing period glass was added and mixing continued for about 30 additional seconds. Each mixture produced thereby was passed through a Buss-Condux compounding extruder (equipped with a standing die) at a melt temperature of about 310° C. The extruded strands were cooled and cut into pellets by a set of conventional revolving knives.

Test specimens of the various compositions were made by injection molding of the pellets at about 310° C. The test specimens were molded into the form of discs (about 2¼ inches diameter, about 60 mils thick) or rectangles (about 2 inches wide, about 3 inches long, about 100–120 mils thick).

Comparative tracking index (CTI) tests were conducted for each composition in accordance with ASTM Test Method D 3638 as described in the 1982 Annual Book of ASTM Standards Part 39. A Beckman Insulation Tracking Test Set, Model DT-1, having platinum electrodes was employed. Usually, depending upon the results, 5 test specimens of each composition were tested at the specified voltage. All compositions were tested at 250 V. Some compositions were additionally tested at 275 V and 300 V. The results are reported as the number of specimens that passed out of the total number of specimens tested. To pass a specimen must receive 50 drops of contaminant (electrolyte) without failure caused by tracking.

The poly(arylene sulfide) polymers employed in the examples were linear particulate poly(p-phenylene sulfide) polymers made in accordance with U.S. Pat. No. 3,354,129. The poly(p-phenylene sulfide) polymers are designated as PPS. The PPS polymers were precured to give a flow rate of about 22–30 g/10 minutes as determined in accordance with ASTM Test Method D 1238 Procedure B modified to use a 600° F. temperature, a 1.270 Kg weight and an orifice having a 0.0825 inch diameter and a 1.25 inch length.

The talcs used in the compositions are described below:

Talc 1—Pioneer 2620 sold by Whittaker, Clark and Daniels, Inc. of South Plainfield, N.J. Particle size ranges from less than 1 micron to over 30 (but less than 44) microns. Average particle size is about 4 microns. Typical chemical composition (calculated as the oxides):

| silica | $SiO_2$ | 55–59 wt % |
|---|---|---|
| magnesium oxide | MgO | 31–34 wt % |
| calcium oxide | CaO | 1–2 wt % |
| aluminum oxide | $Al_2O_3$ | 0.4–0.8 wt % |
| ferric oxide | $Fe_2O_3$ | 0.2–0.5 wt % |
| sodium oxide | $Na_2O$ | less than 0.5 wt % |
| potassium oxide | $K_2O$ | less than 0.5 wt % |
| phosphorus pentoxide | $P_2O_5$ | less than 1 wt % |
| moisture | | less than 1 wt % |
| loss on ignition | | 6–10 wt % |
| pH | | 7–9.5 |

Talc 2—California CP10-40 sold by Pfizer, Minerals, Pigments and Metals Division, New York, N.Y. Particle size ranges from less than 1 micron to about 15 microns. Average particle size is about 1.5 microns. Typical chemical composition (calculated as the oxides):

| silica | $SiO_2$ | 52.4 wt % |
|---|---|---|
| magnesium oxide | MgO | 27.6 wt % |
| Talcium oxide | CaO | 6.2 wt % |
| aluminum oxide | $Al_2O_3$ | 1.4 wt % |
| ferric oxide | $Fe_2O_3$ | 0.3 wt % |
| acid solubles as CaO—max | | 9.0 wt % |
| loss on ignition | | 10.3 wt % |

The above information with respect to talcs 1 and 2 is as reported by the manufacturers. Particle size represents the equivalent spherical diameter in microns. It should be noted that although the typical chemical compositions are given on a free oxide basis the major talc constituents are mostly combined in a complex magnesium silicate.

Other components used in the compositions are briefly described below:

Titanium dioxide—Anatase, a natural crystallized form of titanium dioxide. Melting point of about 1560° C.

Mercaptosilane—3-mercaptopropyltrimethoxysilane A-189 sold by Union Carbide Corp., New York, N.Y.

Zinc stearate—Mold release agent. Commercially available through several companies.

Lithium carbonate—Mold corrosion inhibitor. Commercially available through several companies.

Polyethylene—High density linear polyethylene (HPPE).

Glass fiber—Strands of 497 or 197 Owens Corning fiberglass chopped to give pieces about ⅛ inch in length.

EXAMPLE 1

The components of the compositions of this example and the CTI results corresponding to those compositions are set forth in Table 1. The components are given in parts by weight based upon 100 parts of total composition.

TABLE 1

| Composition | PPS | Glass | Talc 1 | TiO2 | Mercapto Silane | Li2CO3 | HDPE | CTI(No. Passed/No. Tested) 250V | 275V | 300V |
|---|---|---|---|---|---|---|---|---|---|---|
| 1 | 35 | 25 | 25.8 | 12.9 | — | 1.0 | 0.3 | 3/5 | 1/3 | — |
| 2 | 35 | 25 | 25.4 | 12.5 | 0.8 | 1.0 | 0.3 | 5/6 | 3/5 | — |

The results given in Table 1 indicate that the combination of $TiO_2$ and mercaptosilane (3-mercaptopropyltrimethoxysilane) in composition 2 gave better CTI results than composition 1 having only the $TiO_2$.

EXAMPLE 2

The components of the compositions of this example and the CTI results corresponding to those compositions are set forth in Table 2. The components are given in parts by weight based upon 100 parts of total composition.

TABLE 2

| Composition | PPS | Glass | Talc 2 | Talc 3 | TiO2 | Mercapto Silane | Li2CO3 | HDPE | CTI(No. Passed/No. Tested) 250V | 275V | 300V |
|---|---|---|---|---|---|---|---|---|---|---|---|
| 3 | 35 | 25 | 37.9 | — | — | 0.8 | 1.0 | 0.3 | 5/6 | — | — |

TABLE 2-continued

| Composition | PPS | Glass | Talc 2 | Talc 3 | TiO2 | Mercapto Silane | Li$_2$CO$_3$ | HDPE | CTI(No. Passed/No. Tested) 250V | 275V | 300V |
|---|---|---|---|---|---|---|---|---|---|---|---|
| 4 | 33.4 | 23.8 | 28.9 | — | 11.9 | 0.8 | 1.0 | 0.3 | 5/5 | 5/5 | 5/5 |

A comparison of compositions 3 and 4 further demonstrates the utility of the TiO$_2$-mercaptosilane combination. Composition 4 (with TiO$_2$ and mercaptosilane) obtained perfect results (i.e. 5/5) at 250 V, 275 V and 300 V. Composition 3, having only the mercaptosilane, failed to obtain a 5/5 result at 250 V.

What is claimed is:

1. A composition comprising poly(arylene sulfide), titanium dioxide and 3-mercaptopropyltrimethoxysilane; wherein the amount of titanium dioxide and 3-mercaptopropyltrimethoxysilane present is sufficient to increase the resistance of the poly(arylene sulfide) composition to carbonization and track formation.

2. A composition in accordance with claim 1 wherein said poly(arylene sulfide) is poly(p-phenylene sulfide).

3. A composition in accordance with claim 1 further comprising talc.

4. A composition in accordance with claim 1 further comprising glass fibers.

5. A composition in accordance with claim 3 further comprising glass fibers.

6. A composition in accordance with claim 5 wherein said poly(arylene sulfide) is poly(p-phenylene sulfide).

7. A composition comprising:
   (a) poly(p-phenylene sulfide),
   (b) about 5-100 parts by weight of titanium dioxide per 100 parts by weight of poly(p-phenylene sulfide),
   (c) about 0.1-20 parts by weight of 3-mercaptopropyltrimethoxysilane per 100 parts by weight of poly(p-phenylene sulfide),
   (d) 0-140 parts by weight of talc per 100 parts by weight of poly(p-phenylene sulfide), and
   (e) about 0-140 parts by weight of glass fibers per 100 parts by weight of poly(p-phenylene sulfide).

8. A composition in accordance with claim 7 comprising about 20-50 parts by weight of titanium dioxide, about 1-5 parts by weight of 3-mercaptopropyltrimethoxysilane, about 50-115 parts by weight of talc and about 50-100 parts by weight of glass fibers per 100 parts by weight of poly(p-phenylene sulfide).

9. A composition in accordance with claim 7 comprising about 31-41 parts by weight of titanium dioxide, about 2-3 parts by weight of 3-mercaptopropyltrimethoxysilane, about 62-72 parts by weight of talc, and about 66-76 parts by weight of glass fibers per 100 parts by weight of poly(p-phenylene sulfide).

10. A composition comprising poly(arylene sulfide), about 5-100 parts by weight of titanium dioxide and about 0.1-20 parts by weight of 3-mercaptopropyltrimethoxysilane per 100 parts by weight of poly(arylene sulfide).

11. A method for increasing the resistance of a poly(arylene sulfide) composition to carbonization and track formation comprising combining poly(arylene sulfide) with about 5-100 parts by weight of titanium dioxide and about 0.1-20 parts by weight of 3-mercaptopropyltrimethoxysilane per 100 parts by weight of poly(arylene sulfide).

12. A method in accordance with claim 11 wherein said poly(arylene sulfide) is poly(p-phenylene sulfide).

13. An electrical apparatus employing the composition of claim 1 as an electrical insulation material.

14. An electrical apparatus employing the composition of claim 2 as an electrical insulation material.

15. An electrical apparatus employing the composition of claim 3 as an electrical insulation material.

16. An electrical apparatus employing the composition of claim 6 as an electrical insulation material.

17. An electrical apparatus employing the composition of claim 7 as an electrical insulation material.

18. An electrical apparatus employing the composition of claim 8 as an electrical insulation material.

19. An electrical apparatus employing the composition of claim 9 as an electrical insulation material.

* * * * *